Oct. 22, 1968　　　O. MEYER　　　3,406,705

PISTON GATE VALVE FOR HIGH PRESSURE MEDIA

Filed April 28, 1966　　　4 Sheets-Sheet 1

INVENTOR
OTTO MEYER
BY
ATTORNEY

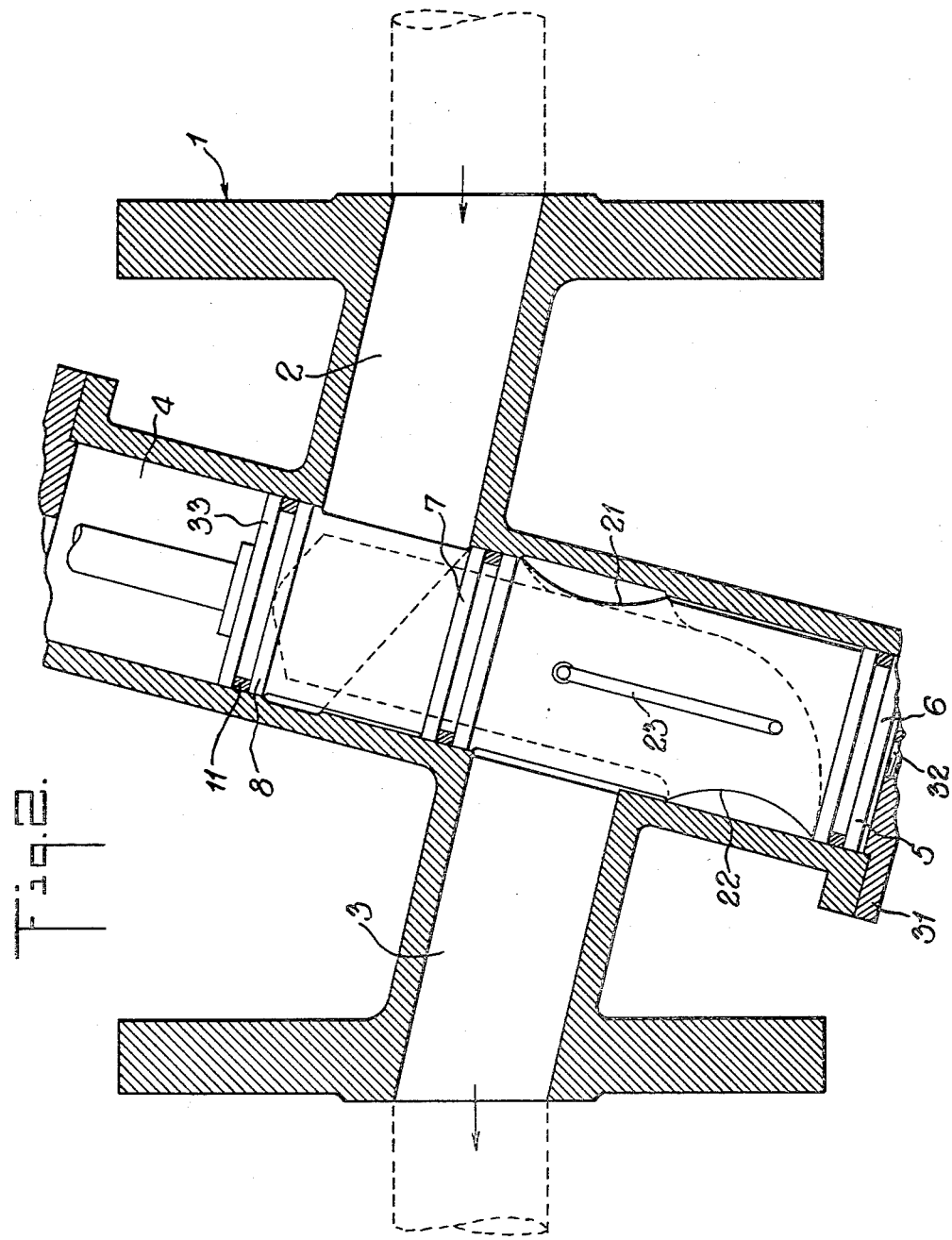

Oct. 22, 1968   O. MEYER   3,406,705
PISTON GATE VALVE FOR HIGH PRESSURE MEDIA
Filed April 28, 1966   4 Sheets-Sheet 3
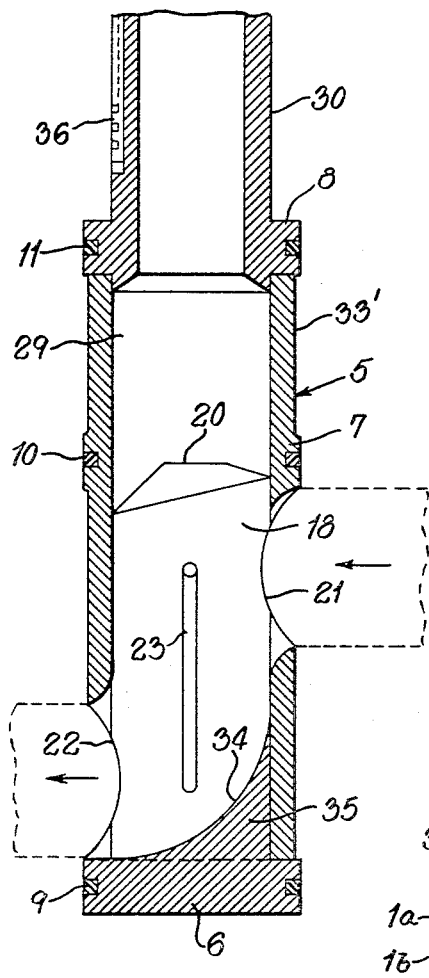
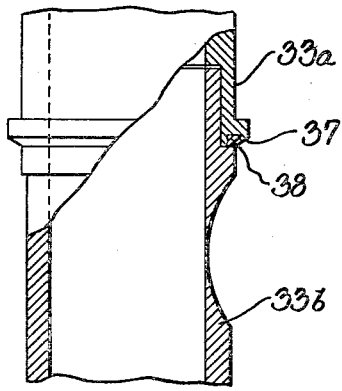
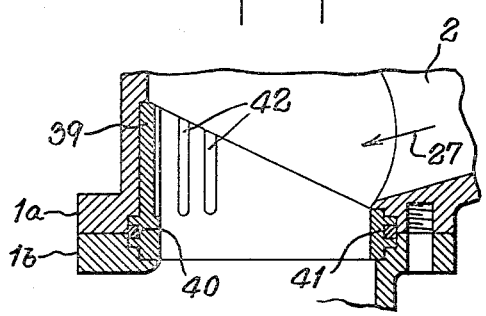
INVENTOR
OTTO MEYER

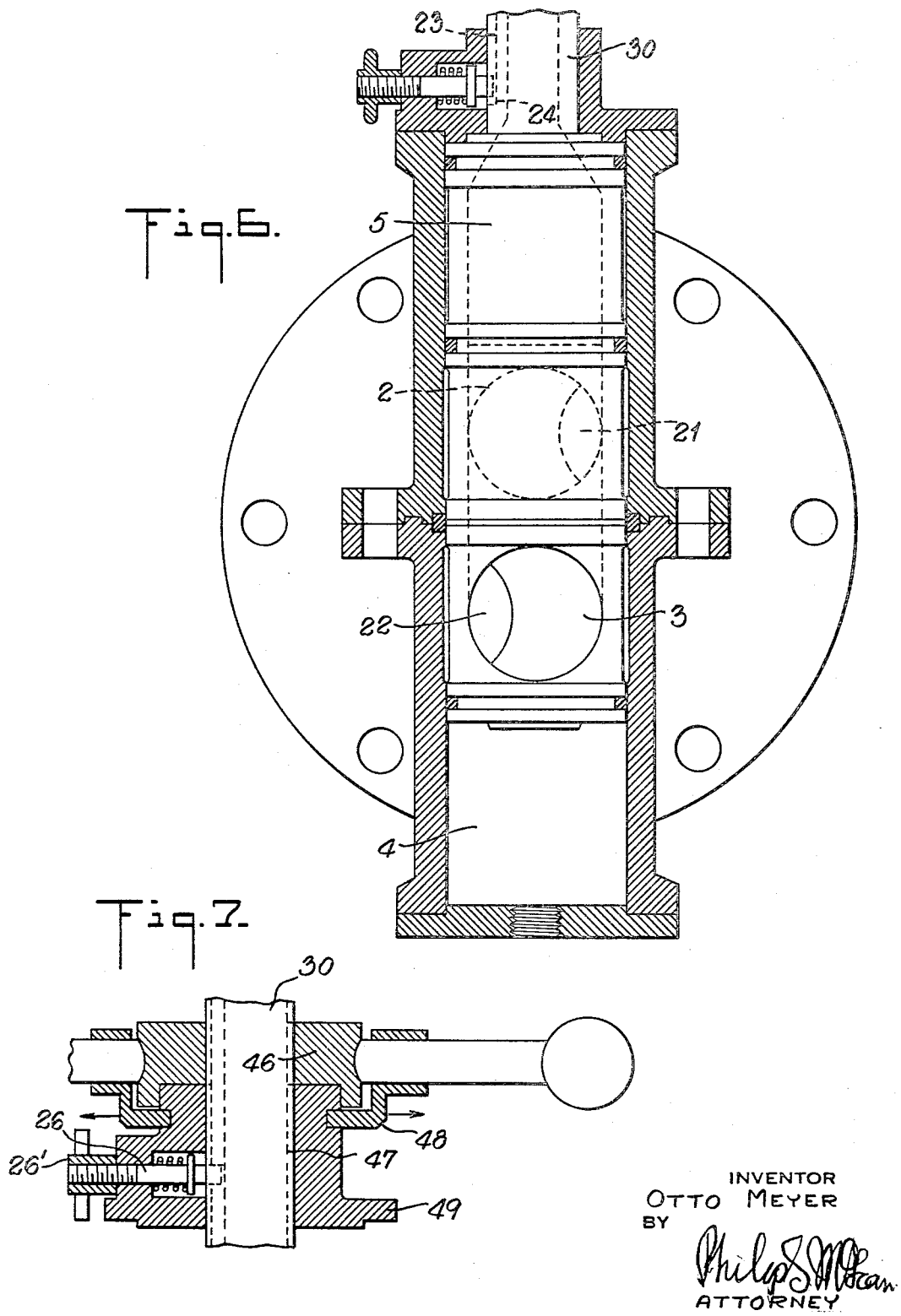

United States Patent Office 3,406,705
Patented Oct. 22, 1968

3,406,705
PISTON GATE VALVE FOR HIGH
PRESSURE MEDIA
Otto Meyer, Ehlershausen, Germany
Filed Apr. 28, 1966, Ser. No. 551,835
Claims priority, application Germany, May 26, 1965,
M 65,370
5 Claims. (Cl. 137—207)

The invention herein disclosed relates to plug valves of the piston gate type and the general objects of the invention are to provide such a valve for handling high pressure materials, such as liquids and gases, or those materials carrying a certain amount of solids.

Special objects of the invention are to construct the valve with unrestricted, full flow passages, of simple, durable and low cost construction, in which the sealing parts will be protected against wear and corrosion.

Other special objects of the invention are to provide the valve with cushioning means to avoid shock and to control movement of the valve for opening, closing and throttling purposes.

Other desirable objects and the novel features of construction, through which the purposes of the invention are attained, are set forth and will appear in the course of the following specification.

The drawings accompanying and forming part of the specification are illustrative of present practical embodiments of the invention. Structure, however, may be modified and changed as regards the immediate illustration; all within the true intent and scope of the invention, as hereinafter defined and claimed.

FIG. 1 in the drawings is a central sectional view of one of the valves, in open position, with parts broken away.

FIG. 2 is a similar view of a slightly modified form of the valve in closed position.

FIG. 3 is a broken sectional view of a modified form of the valve plug.

FIG. 4 is a broken sectional detail of a form of piston valve plug having a bevelled valve head for engagement with a corresponding valve seat in the valve housing.

FIG. 5 is a broken sectional detail illustrating modification of the valve casing to carry interchangeable valve seats.

FIG. 6 is a broken longitudinal sectional view of a further modification with a divided valve housing.

FIG. 7 is a broken sectional detail of a modified form of mechanism for effecting quick or slow operation of the valve.

Figure 1:
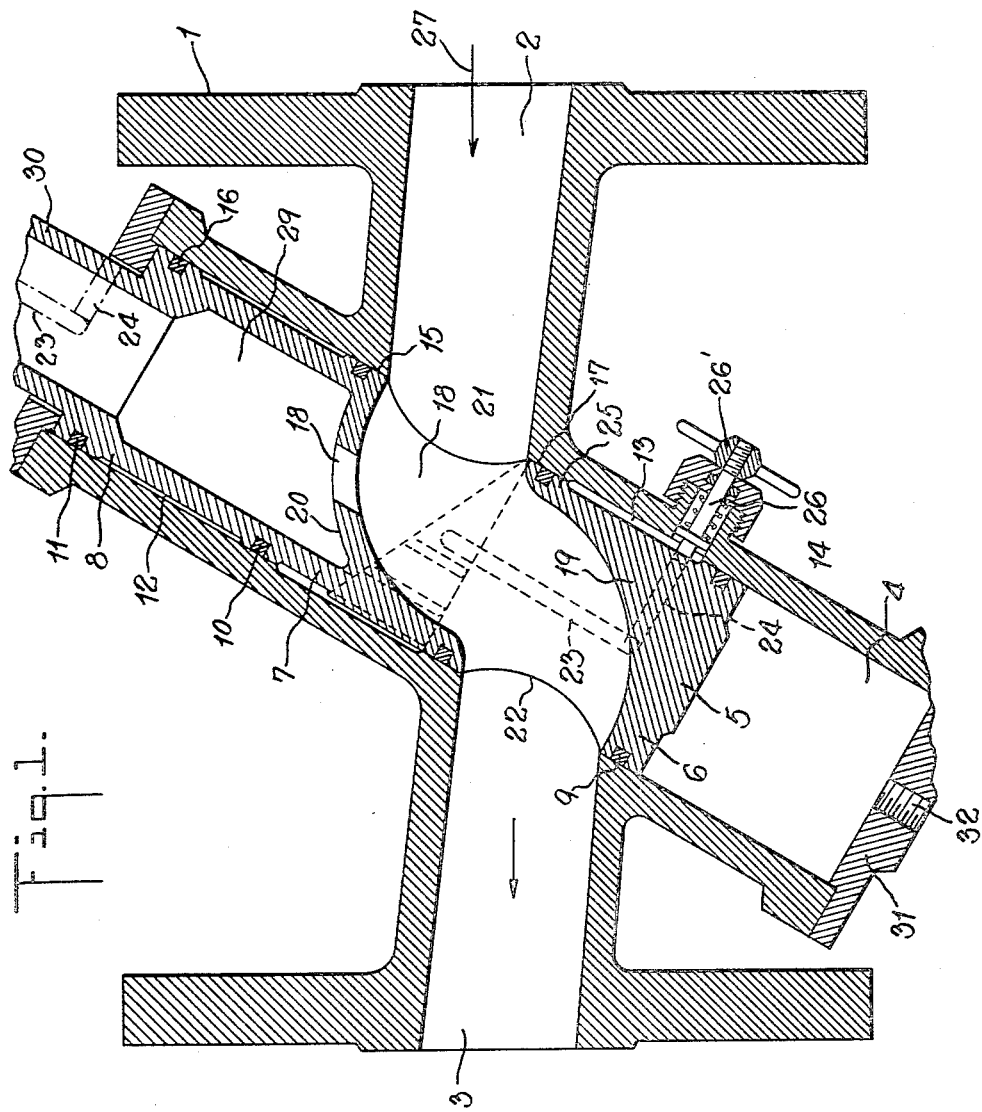

In FIG. 1, the body or housing 1 is formed with inlet and outlet passages 2 and 3 in staggered relation, but with the same angle of inclination in respect to the cylindrical bore 4 for the hollow piston form of gate 5.

This gate has the piston head enlargements 6, 7 and 8 at its opposite ends and intermediate portions fitted with O rings 9, 10, 11, cooperating with companion sealing faces 15, 16 and 17 on the housing.

Between the piston head enlargements 6, 7 and 8, the sliding gate is reduced in diameter, providing annular relief spaces 12 and 13 for the flow medium, providing desired pressure relief in the operation of the valve.

The gate has a free through flow passage 18, registering at opposite ends with the passages 2 and 3 of the housing, and circular in cross section, with curved bottom and top walls 19 and 20.

With this construction there is no division of the flow medium and no circulation loses or dead spaces allowing deposit of foreign matter.

Also these unimpeded free flow formations permit passage of a special ball "pig" or "go devil."

The gate is rotatable in the housing to carry the circular inflow and outflow ports 21, 22 into throttling positions with respect to the passages 2 and 3 and longitudinal movement is guided by a groove 23 in the side of the gate which, for rotary movement, terminates in a circumferentially extending groove 24, engaged by a radial pin 26.

These guide grooves and holding pin may be provided in the lower or upper ends of the parts, as indicated in FIG. 1.

The upper range may be chosen, if in addition to piston heads 6 and 8, another sealing piston head 25 is provided between piston enlargements 6 and 7.

This additional sealing piston formation 25, in the open position, prevents the flowing medium from entering the annular space 13 and flowing to outlet 3, under flow passage in direction of the arrow 27. Wearing of the sealing parts is thus avoided by piston head 25.

Groove 23 and the angled extension 24 of the same allows rotation of the gate only in the open position, so that wear of the sealing element is prevented.

The guide pin 26 in engagement with the circumferential portion 24 may be utilized to hold the gate in any desired position.

A bore 28 in the top guide and separating wall 20 of the gate connects the through flow passage in the gate with the hollow space 29 in the upper portion of the gate, which extends up through the hollow gate rod 30 serving to provide an air cushion for dampening pulsation and absorbing dynamic shock in quick operation of the valve.

As the valve is saved from wear in open and closed positions and shock pressures are eliminated or reduced, it may be used for slow as well as fast operation.

The lower end of the operating cylinder is shown closed by a cover 31, having a bore 32 for connection of a hydraulic or pneumatic operating means enabling the valve to be operated by power or manually.

FIG. 2 shows the inlet and outlet connections 2, 3 having a greater inclination, so that the cylindrical operating chamber 4 has a greater inclination.

In FIG. 2 the piston element is shown connected with a plate 33, closing the upper end of the piston. In this view, the additional sealing piston 25 has been omitted as not being ordinarily essential if the valve is in service for gas or fluid medium.

FIG. 3 illustrates a simplified form of gate 5, consisting of a drawn tube having a cylindrical wall 33' and provided with a bottom piece 35 presenting a guide face 34.

The hollow operating rod 30 provides additional cushioning space 29 and is shown with teeth 36, for engagement by a mechanical operating member.

A guide and separating wall 20 separates the flow passage 18 from the space 29, but permits passage of gas or air for a compression cushion.

The inlet and outlet 21, 22 are of a size and shape to provide unrestricted free through flow.

FIG. 4 shows how the gate may be made with bevelled valve formations 37 to cooperate with corresponding valve seats in the housing and these may be sealed by O rings 38.

If a divided housing is utilized, such as shown in FIG. 6, interchangeable valve seats 39 may be provided as shown in FIG. 5, these extending over the parting line between the sections 1a and 1b.

This interchangeable seat 39 is sealed by O ring 41 in groove 40, at the parting line.

Seat 39 is shown extended on the side opposite the inlet and provided with equalizing grooves 42 to relieve pressure and prevent O ring 10 from being squeezed out of its groove.

The divided form of housing shown in FIG. 6 corresponds in a general way with the housing of FIG. 1, with parts 1a, 1b connected by flanges 43, 44, sealed by O ring 45; the latter also sealing the annular clearance space 13.

FIG. 6 shows the guide grooves 23, 24 in the hollow gate rod 30.

FIG. 7 shows the upper portion of the gate rod 30 provided with a lever or handwheel 50, having an inner part 46, threaded at 47 on the gate rod and with jaws 48 for engagement with the rigid upper cover 49 of the housing. This cover also carries the guidepin and locking device 26.

The circumferential groove 24 may be provided with notches engageable by guide pin 26 to hold the valve in definite positions of adjustment.

What is claimed is:

1. Piston gate valve comprising in combination:
   a valve housing having a piston bore and angularly related inlet and outlet at opposite sides of the same,
   a piston valve element operable in said bore having a flow passage therethrough to register with said inlet and outlet in the open position of the valve,
   said piston valve element having a hollow tubular operating column and provided with a passage opening into said through flow passage,
   said piston having a longitudinally extending groove terminating at one end in a circumferentially extending groove, and
   a spring pressed guide pin on the housing engageable in said longitudinally and circumferentially extending grooves.

2. The invention according to claim 1 in which said circumferentially extending groove has notches therein engageable by said pin for holding said piston in definite angularly rotated positions.

3. The invention according to claim 1 with said valve housing constructed in separable sections and having interchangeable valve seats interposed between the sections and extended at the outlet side and provided with pressure relieving grooves therein.

4. The invention according to claim 1 with said piston constructed in separable sections and provided with bevelled valve element and O ring seal between said sections and at said bevelled valve element.

5. The invention according to claim 1 with said valve housing in separable sections,
   a separable valve seat between said sections and
   an O ring seal between said sections and said valve seat.

References Cited

UNITED STATES PATENTS 1,203,395  10/1916  Palmer _____ 251—311
3,159,378  12/1964  Haag _____ 251—325

ALAN COHAN, *Primary Examiner.*